W. A. REILLY.
LATHE CHUCH.
No. 47,981. Patented May 30, 1865.
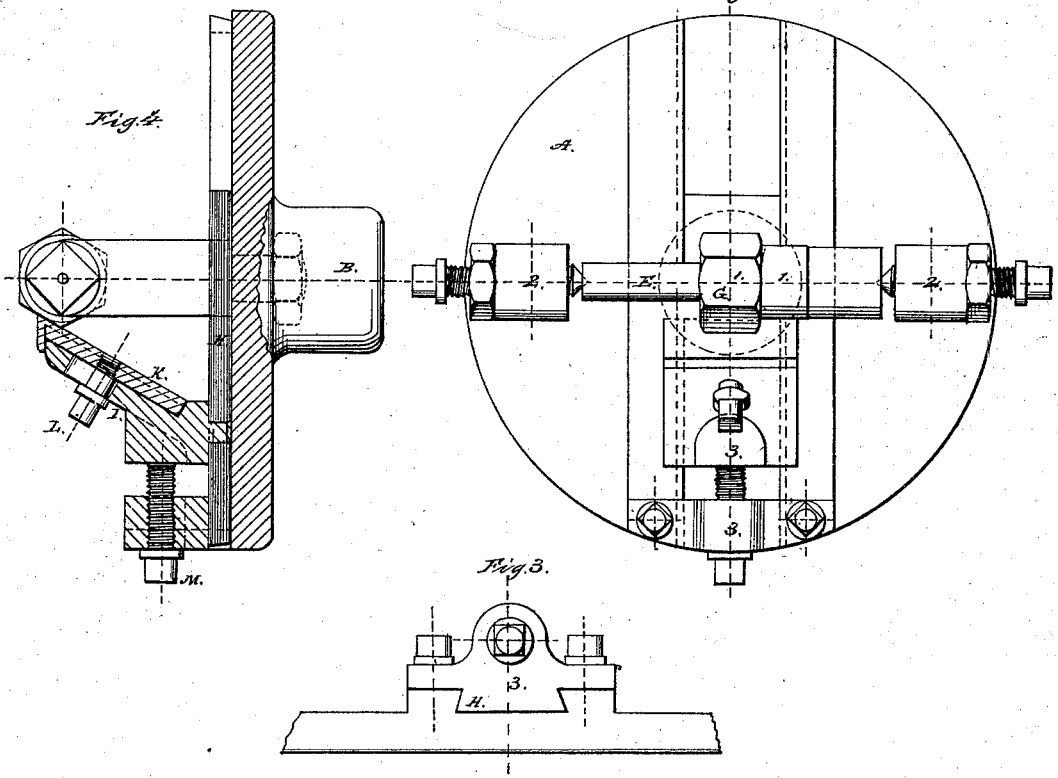

UNITED STATES PATENT OFFICE.

WM. A. REILLY, OF CINCINNATI, OHIO.

IMPROVED LATHE-CHUCK.

Specification forming part of Letters Patent No. 47,981, dated May 30, 1865.

*To all whom it may concern:*

Be it known that I, WILLIAM A. REILLY, of Cincinnati, in the county of Hamilton and State of Ohio, have invented a new and useful Improvement in Lathe-Chucks; and I do hereby declare that the following is a full and exact description thereof, reference being had to the accompanying drawings, and to the letters of reference marked thereon.

My invention consists of a peculiar construction of chuck for holding screw-nuts in order to turn the latter in a lathe.

In the accompanying drawings, Figure 1 is a top view of my improved lathe-chuck. Fig. 2 is a ground plan of the same. Fig. 3 is a detached view of part of the chuck. Fig. 4 is a sectional view of the same.

In the construction of my improved lathe-chuck the main plate A and the screw-socket B (for attaching the chuck to the mandrel of the lathe) may be of the usual form. Inserted into the plate A are two studs, C C', carrying set-screws D D'. These two set-screws hold a mandrel, E, upon which the nut G is placed to be turned. In order to hold the nut in place upon the mandrel, I have arranged a slide, H, upon the face of the main plate A. This slide H carries an oblique arm, I, upon the face of which is an oblique slide, K, made adjustable to proper height on the oblique arm by means of a set-screw, L. Both the slide H and the arm I are adjustable by means of the set-screw M.

The operation is as follows: The nut G being placed upon the mandrel E, the slide H is driven forward by the set-screw M until the arm I or its slide K comes to bear upon the nut G and hold the same firmly in place. Then the chuck is screwed upon the mandrel of the lathe, and the face of the nut G turned off and finished upon one face. Now the slide H is withdrawn until the nut G can be rotated and set for a new face to be finished. The nut being again secured in place by means of slide H, the new face of the nut is finished. Thus one face of the nut after another is turned off and finished until the nut is completed, whether the same has four, six, or more sides or faces.

It will be observed that oblique arm I stands at such an angle as to bear upon the plane of the face of the nut shown in the drawings. This nut is six-sided; but the chuck may be adapted to nuts having four sides, or any other number, and work equally well.

Having thus fully described my invention, what I claim, and desire to secure by Letters Patent of the United States, is—

The above-described lathe-chuck, provided with the slide H, arm I, and slide K, with the adjusting-screws M and L, substantially in the manner and for the purposes set forth.

WILLIAM AMBROSE REILLY.

Witnesses:
WILLIAM S. HANSELMAN,
JOHN ROTH.